US 6,593,766 B1

(12) United States Patent
Aisa (10) Patent No.: US 6,593,766 B1
(45) Date of Patent: Jul. 15, 2003

(54) METHOD FOR ESTIMATING THE DURATION OF THE INTERRUPTIONS IN THE SUPPLY FROM THE ELECTRIC MAINS IN AN ELECTRIC APPARATUS HAVING AN ELECTRONIC CONTROL

(75) Inventor: Valerio Aisa, Fabriano (IT)

(73) Assignee: WRAP SpA, Fabriano (IT)

( * ) Notice: Subject to any disclaimer, the term of this patent is extended or adjusted under 35 U.S.C. 154(b) by 0 days.

(21) Appl. No.: 09/763,288

(22) PCT Filed: Oct. 8, 1999

(86) PCT No.: PCT/IB99/01648

§ 371 (c)(1),
(2), (4) Date: Feb. 20, 2001

(87) PCT Pub. No.: WO00/20931

PCT Pub. Date: Apr. 13, 2000

(51) Int. Cl.$^7$ ................ G01R 31/36; G05D 23/32; G04F 10/00

(52) U.S. Cl. ............ 324/771; 62/130; 62/158; 702/176

(58) Field of Search ............ 324/771, 537; 62/158, 130; 702/130, 176

(56) References Cited

U.S. PATENT DOCUMENTS

| 4,291,543 A | * | 9/1981 | Alluto ............ 62/158 |
| 4,375,669 A | * | 3/1983 | Johnson et al. ........ 700/158 |
| 4,630,449 A | * | 12/1986 | Adams ............ 62/130 |
| 4,884,626 A | | 12/1989 | Filipowski |
| 5,825,648 A | * | 10/1998 | Karnowski ........ 700/82 |
| 6,229,450 B1 | * | 5/2001 | Malmsten ........ 340/652 |

FOREIGN PATENT DOCUMENTS

| EP | 0819945 | 1/1998 |
| GB | 2031631 | 4/1980 |
| GB | 2132429 | 7/1984 |

* cited by examiner

Primary Examiner—Ernest Karlsen
Assistant Examiner—Paresh Patel
(74) Attorney, Agent, or Firm—Cesari and McKenna, LLP (57) ABSTRACT

A method for estimating the duration of the interruptions in the supply from the electric mains in an electric appliance having an electronic control, in particular a household appliance, includes the steps of (a) on the occasion of an interruption of the supply voltage of the apparatus, measuring and storing the value of at least one quantity that is characteristic of the operating status of the apparatus; (b) on the occasion of the restoration of the supply voltage, measuring the current value of the at least one characteristic quantity; (c) comparing the stored value and the current value of the at least one characteristic quantity; and (d) estimating, on the basis of the comparison, the duration of the interruption of the supply voltage.

35 Claims, 4 Drawing Sheets

METHOD FOR ESTIMATING THE DURATION OF THE INTERRUPTIONS IN THE SUPPLY FROM THE ELECTRIC MAINS IN AN ELECTRIC APPARATUS HAVING AN ELECTRONIC CONTROL

FIELD OF INVENTION

The present invention refers to method for estimating the duration of the interruptions in the supply from the electric mains in an electric apparatus having an electronic control, in particular a household appliance, and to an apparatus implementing such a method.

BACKGROUND OF THE INVENTION

It is known that certain electric apparatus, in particular household appliances, having a control system of the electronic type, include the clock function, usually available on a control panel.

With reference, in particular, to the field of household appliances of the so-called white type, such a clock function is typically associated with cooking apparatuses (ovens and cookers) and with apparatuses for household heating (boilers), while it is now also gradually extending to refrigerators, washing machines, dishwashers and water heaters.

It is also known that the availability of a clock function associated to the control system of a household appliance ensures several advantageous functions, such as:

the possibility of programming the execution in time of certain operating cycles of the household appliance, even if the user is not present (let us think for instance of an oven wherein a cooking program may be postponed, or about postponing a washing cycle for a dishwasher or washing machine);

the possibility of managing the opportunities offered by possible time based electricity rates, i.e. the possibility of programming the appliance operation at a time during the day when the electricity costs are lower than during other day times;

the possibility of supplying the user with current time information, which is not essential but useful, anyway.

However, it is obvious that such advantages become void if the above clock function is not protected against a possible interruption of the electric energy, or blackout, as it may usually happen for household appliances.

It is also known that the implementation of the cited clock function through a microcontroller is a simple and low-cost thing, since the operation itself of such an electronic device is beaten out by the frequency of a quartz or other oscillating element capable of generating a time base.

However, keeping a clock function activated during a blackout is quite a difficult operation, as it presumes the presence of an auxiliary source of electric current, such as a battery; now, a battery represents not only an expensive item, but also requires regular maintenance (battery replacement) by the user.

The fact that a clock function in white household appliances is typically not protected against possible mains supply interruptions represents undoubtedly a problem, which is the more serious the more blackouts are frequent.

For instance, in the case of present electric ovens equipped with a clock-programmer, where cooking is programmed to start at a certain time, a blackout of the mains supply, even a short one, while the user is not present, will normally cause cancellation of the programmed cooking and a consequent considerable nuisance for the user, who back home will find out that the oven did not perform the programmed function. Only highly expensive types of ovens provide for a sort of protection against blackouts, but this is typically limited to a few seconds only. In such an instance, a solution to the problem is to keep the microcontroller performing the clock function alive for a short time, using the energy stored within a high capacity electric capacitor; this is now possible thanks to the development of the CMOS electronic technology, through which consumption for electronic devices have been enormously reduced.

However, such a simple and fine solution has the drawback, anyway, of being unable to fully solve the problem, since it will only cover a limited time and have an expensive cost.

The problem might be solved, theoretically, in a complete way by using a buffer battery, to keep the clock function always activated also when no mains voltage is available. In this case, however, beside the direct cost of such a solution, further costs should be added to, being induced by the necessity of limiting the working temperature of the cooking apparatus, so as to avoid damages to the battery itself (which cannot withstand high working temperatures) and of course the trouble for its regular maintenance. For this reason, application of this technical solution has been excluded so far from the field of household cooking apparatuses.

It should finally be noticed that, in the case of household appliances with an electronic control but no clock function for the user, it would be quite useful being able to obtain information about the number and/or duration of interruptions in the operation, due to an electric supply blackout, in particular in view of the maintenance, repair and service for the apparatuses themselves.

SUMMARY OF THE INVENTION

Based on the above considerations, the present invention has the purpose to provide a method and/or an electric apparatus having an electronic control, in particular a household appliance, which is fitted with proper means which allow for estimating the duration of a more or less extended interruption of the mains voltage or blackout and, when required, solve the problem of the loss of the information relating to the current time (clock function), without the need of auxiliary energy sources, such as batteries or high rated capacitors.

These and other aims, which will be clear in the following, are reached according to the present invention by a method for estimating the duration of the interruptions in the supply from the electric mains in an electric apparatus having an electronic control, in particular a household appliance, and by an apparatus implementing such a method, having the features of the annexed claims, which form an integral part of the present description.

The present invention is based on the recognition of the fact that a solution to the problem of the loss of the current time (clock function) due to a blackout can be obtained starting from the examination of the change of the operative status of an electric apparatus, from the instant a voltage blackout occurs to the instant the voltage is restored, the law by which the status of one or more parameters monitored in the absence of electric current evolves in the time being experimentally known a priori.

To this purpose, according to the invention, the operative status of the electric apparatus can be described by the value reached by one or more quantities characterizing the operation itself. For instance, temperature is a quantity which generally characterizes very well on its own the operative status of a household appliance, whose evolution in case of an electric blackout depends on the features proper of the product (time constants of the oven, of the refrigerator, of the water heater, of the washing machine, of the dishwasher, . . . ) and on the so-called surrounding conditions (temperature inside the product and temperature of the external environment). The law according to which temperature evolves within a household appliance in case of an electric blackout can be easily derived through simple experimental tests, and be implemented equally easily in the program of a microcontroller, using proper techniques of the tabular type or based on the use of the fuzzy logic, which is well known by now.

In this way, according to the present invention, the microcontroller can be enabled to compare the value of the temperature when the electric energy is restored (power on) with the value of the temperature detected on the occasion of the blackout and; by knowing the law according to which the temperature evolves within the household appliance when no electric energy is present, to estimate with sufficient approximation the actual duration of the blackout itself, and then proceed to the clock updating.

Such an updating is performed by the microcontroller simply, by adding the estimated duration of the blackout to the value of the current time which was taken on the occasion of the blackout itself, being said value properly stored on a suitable nonvolatile memory (such as an EEPROM or a FLASH memory).

In this way a clock is obtained, which is capable of "virtually" measuring the time also during the periods when it is unable to operate, due to a blackout of the electric mains and other backup sources (batteries or high rated capacitors).

In order to correctly perform the "virtual" clock function according to the present invention, the control system of the electric apparatus should have at least the following requisites:

1. be managed by a microcontroller or other electronic device being dedicated to specific applications (ASIC);
2. have a nonvolatile memory, preferably of the EEPROM or FLASH type, capable of communicating with the microcontroller or dedicated electronic device taking charge of microcontroller's functions, wherein informative data related to the time when a blackout has occurred are stored;
3. have suitable means which allows the microcontroller to promptly detect a blackout, so as to proceed fast (in a few tenths of milliseconds, and anyway before the microcontroller and the nonvolatile memory cease to operate properly) for storing the status of the monitored parameter and the current time;
4. finally, have in the program memory of the microcontroller all the information relating to the law of variation in the time of the quantities (or quantity) which define the status of the monitored parameter, so as to be able to estimate, on the basis of the variation of said status, the blackout duration and proceed consequently to the clock updating.

Conditions 1) and 2) are typically verified in most present electronic control systems for electric apparatuses, in particular household appliances, which usually comprise a microcontroller having proper electrically writable and erasable memory means.

With reference to condition 3), a prompt detection of a blackout and a fast storage of the current time and the system status are allowed in a simple way, by exploiting the energy accumulated in the filter capacitor of a typical microcontroller feeder, as described later.

Also condition 4), as said above, can be is easily achieved by software, following the execution of the experimental activities required for defining the law describing the evolution of a household appliance status during a blackout.

From the above, it results that the solution being proposed according to the invention does not practically involve significant additional costs for the product, though allowing it to efficiently solve the previously described problem.

BRIEF DESCRIPTION OF THE DRAWINGS

Further objects, features and advantages of the present invention will become apparent from the following detailed description and the annexed drawings, supplied by way of non limiting example, wherein.

DETAILED DESCRIPTION OF THE INVENTION

Figure 1:
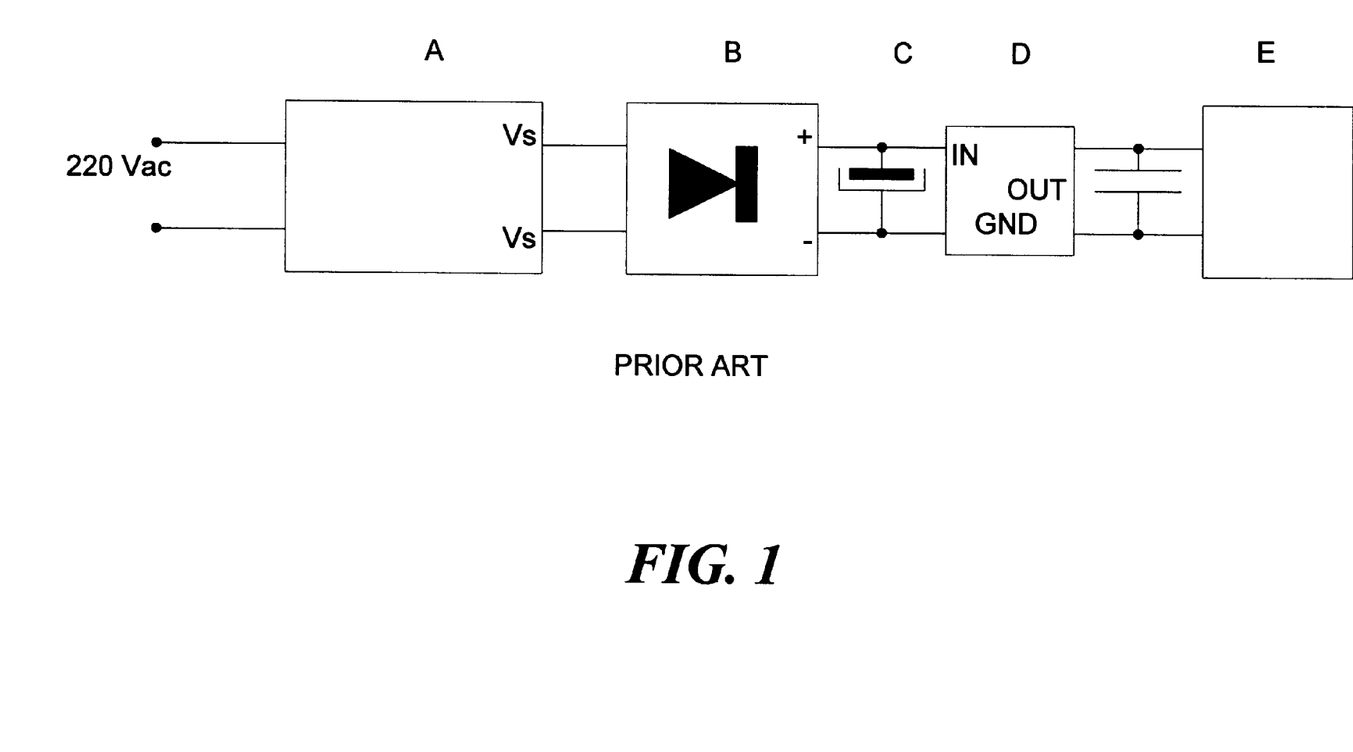
FIG. 1 shows schematically a typical electric supply circuit of the microcontroller employed in the electronic control system of a household appliance.

In order to made clear the practical aspects of the above points 1), 2) and 3) above, FIG. 1 shows the electric diagram of a typical power supply for a microcontroller E, pertaining to the electronic control system of an electric apparatus, in the specific case a household appliance. Said power supply, being of known realization and operation, comprises a transformer A, a rectifier B formed by a diode bridge, a filter capacitor C and a voltage regulator D.

Figure 2:
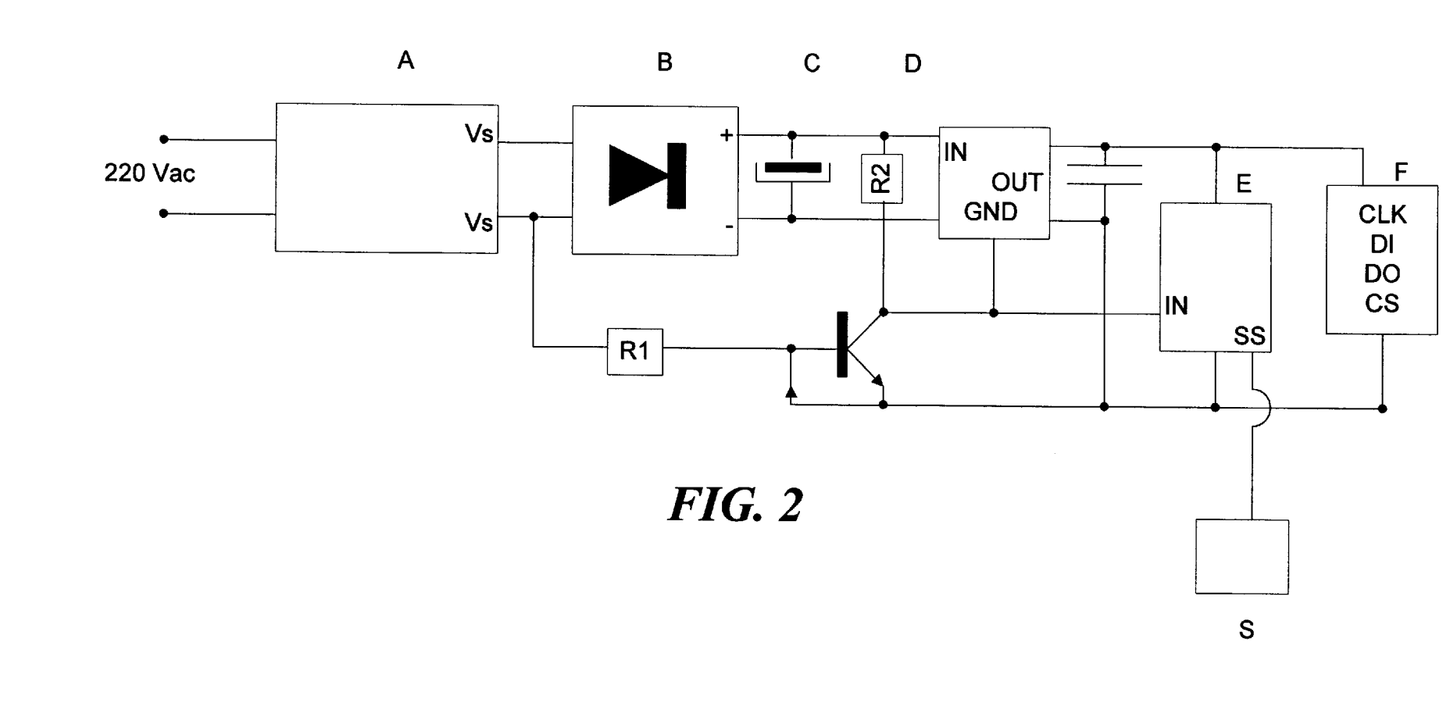
FIG. 2 shows schematically a circuit arrangement being part of the electronic control system of a household appliance according to the teachings of the present invention.

The need of a prompt blackout detection as for the previous item 3), can be fulfilled through a circuit arrangement as represented in FIG. 2.

Compared to the previous FIG. 1, FIG. 2 shows an example of an electronic circuit apt to let the microcontroller E to promptly detect a possible voltage mains blackout.

Symbols A, B, C, D and E have the same meaning as represented in FIG. 1.

Reference S indicates generic sensor means, for detecting the value of one or more quantities, which are considered characteristic of the operative status of the appliance, and for communicating them to a suitable input SS of the microcontroller E.

Should the quantity under consideration be, just by way of example, the internal temperature of refrigerator or an oven, then the sensor means S is a temperature sensor with adequate characteristics for the intended purpose (such as an NTC thermistor for a refrigerator, an NTC thermistor for high temperature or a PT500 or PT1000 thermoresistance for an oven, and so on).

Reference F indicates an electrically writable and erasable memory, such as an EEPROM, associated to the microcontroller E, so that the latter, duly programmed to the purpose, is able to:

store in the memory F the current time value, instant by instant;

store in the memory F the information relating to the appliance status, i.e. the value reached by at least one quantity characterizing the appliance operation;

recover from the memory F the information relating to the appliance status, previously stored in it.

Reference T indicates a transistor, on whose base the alternate voltage at the output of the secondary of the transformer A is applied, through a proper resistance R1.

In this way, a square wave is produced at the output to the collector of the transistor T, which is presented with the aid of a pull-up resistance R2 to a proper input IN of the microcontroller E. The time period of the above square wave is 20 milliseconds, considering a mains frequency equal to 50 Hz.

From the above it will be appreciated, according to the arrangement represented in FIG. 2, how the microcontroller E, through a simple programming, is able to detect an incipient blackout when the mains pulse at the input IN is lacking for more than 20 milliseconds.

In such an event, by exploiting the energy accumulated in the filter capacitor C, the microcontroller E can further work on correctly for another few instants and proceed with the storing in the memory F of the current time information and the value of the quantities (or quantity) characterizing the operative status of the appliance.

Thereafter, when the electric energy is restored, the microcontroller E will retrieve from the memory F the information relating to the time and to the status of the monitored parameter prior to the blackout, estimate the duration of the latter and update the clock, by adding the estimated duration of the blackout to the current time value stored in F when the blackout itself occurred, before the latter would completely stop the system.

Thus, a "virtual clock" function is performed which, even if no back-up system is available (battery or other electric energy accumulating means), is able to solve the problem of the loss of the current time information caused by a blackout, even an extended one.

It is obvious that the solution suggested according to the present invention it is not intended for obtaining an exact computation of the duration of a blackout, and within such frame, inaccuracy margins are possible: however, the important factor is that the control system can compute with sufficient approximation the duration of the supply interruption, for then proceeding to an update of the clock which allows the appliance to carry out its programmed function, approximately at the desired time.

Figure 3:
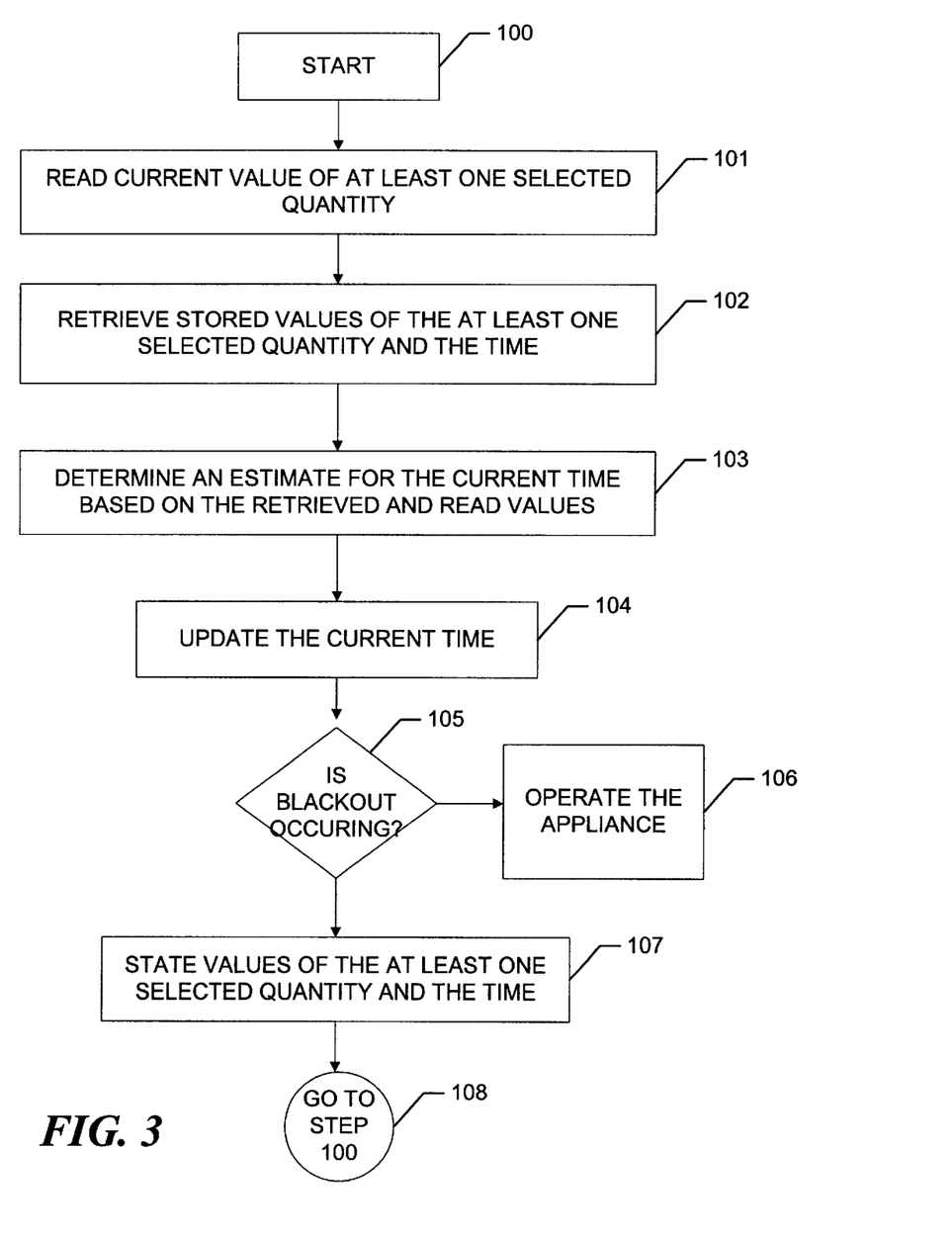
FIG. 3 shows a flow diagram illustrating the operation principle of the circuit arrangement of FIG. 2.

FIG. 3 shows a flow diagram describing the operations performed by the microcontroller E for obtaining the "virtual clock" function at the basis of the present invention.

Block 100 is the start block of the program, which is started when the microcontroller E is newly supplied after a blackout occurred.

Said block 100 passes the control to block 101, which reads, through the sensor means S (FIG. 2), the current status of the monitored parameter, or of the quantities (or quantity) representing it; the control is then passed to block 102.

Block 102 provides for retrieving from the nonvolatile memory F the value of the time and of the status of the monitored parameter, which had been in F upon occurrence of the blackout; then the control passes to block 103.

Block 103 provides for estimating the duration of the blackout, by comparing the values of the present status (detected at block 101) and the values of the previous status of the monitored parameter (retrieved at block 102), on the basis of the law according to which the quantities (or the quantity) defining the appliance operation status evolve in time on absence of electric energy; such a law, as mentioned above, is properly implemented in the program of the microcontroller E, for example in a tabular form or according to the fuzzy logic. Then, the control is passed to block 104.

Block 104 provides for the updating of the time, i.e. of the clock; this is performed by simply adding the estimated duration of the blackout (as calculated at block 103) to the current time value stored in F upon occurrence of the blackout itself (see the subsequent block 107) and retrieved from the memory F (block 102).

Then, the control is passed to block 105.

Block 105 is a test block, which provides for verifying whether a blackout is occurring or not; such a control is performed by the arrangement represented in FIG. 2, previously described.

In the negative (output NO), the control is passed to block 106, so that the microcontroller E supervise the performance of the normal activities or functions of the household appliance; the control then returns to block 104, for the normal updating of the clock.

In the affirmative (output YES), i.e. in the event an incipient blackout is detected, the control is passed to block 107, which provides for promptly save the information relating to the current time and the system status in the nonvolatile memory F; then, the control passes to the block 108, which is a simple wait state of the exhaustion of the energy accumulated in the capacitor C of FIG. 2, being all useful information related to the system status upon occurrence of the blackout permanently recorded by now in the memory F.

It is clear that, when the mains voltage is back again, the microcontroller E can perform the program again starting from the start block 100.

From the above, it will be apparent how the solution previously described according to the invention makes it possible to realize an electronic clock being capable of solving the problem of the loss of time information, caused by a more or less extended mains supply interruption or blackout, and how this can be accomplished in a simple and cost-effective way, without requiring auxiliary energy sources, such as batteries or high rated capacitors.

At any rate, it has to be highlighted that the present invention is not solely limited to solving the problem of loss of the time information, but it should also be regarded as extended to the wider capability of estimating with a sufficient approximation and recording the duration of possible interruptions of the electric mains, along with their number, frequency, and so on.

This may be useful, as mentioned, for the purposes of maintenance, repairing and servicing of household appliances having an electronic control, even if they are not including a clock function for the user's use.

For such applications, the microcontroller E may in fact be easily programmed for storing, within proper registers of the memory E, said information (duration, number, frequency, etc.) concerning the blackouts the apparatus has been submitted to; such information, which form part of the appliance "history", would be extremely useful to servicing people, for the maintenance of the appliance itself and/or for a diagnosis about the reasons of possible fault of the appliance.

The idea of a "virtual clock" according to the present invention is advantageously applicable to continuous running household appliances, such as refrigerators and freezers, water heaters and boilers (which normally have a room temperature sensor, with obvious economical benefits should such a parameter be suitable for computing the blackout duration).

In any case, the application of the present invention is in general particularly advantageous for those household appliances, even if of the type for periodical or discontinuous use (such as cooking apparatuses and washing machines), which provide a programming capability in time, for the execution of operative cycles or functions, also if the user is not present.

As previously mentioned, in fact, in the instance of ovens the analysis of temperature variations within the cooking chamber G is quite easy (a temperature sensor $S_2$ is necessarily provided within said chamber); then, the association of a room temperature sensor $S_1$ to the appliance control system is very much easier and cheap, should also such a parameter be considered necessary (however, in most cases it is not) for a more accurate computation of the blackout duration.

However, while the estimation of the duration of the mains interruption is rather easy when the blackout occurs while the oven in operation, the same estimation would not be performed if, upon occurrence of the blackout, the oven being programmed for performing a differed cooking has not yet reached the programmed start time.

In order to solve also the situations where, in presence of a differed programming of the function to be accomplished by a determined appliance, a blackout occurs when such a function has not yet been activated, it is proposed as an efficient remedy the exploitation of the thermal evolution on absence of an electric power of those components of the system being subject to heating during the operation of the system itself, and which have a thermal capacity such to warrant a sufficiently slow dynamics of the temperature if no mains voltage is available.

Therefore, considering that the present invention is provided for electrical apparatuses, such as household appliances having an electronic control system, in the preferred embodiment of the invention the quantity to be used as the indicator of the operation status of the appliance, for estimating the duration of a blackout, is the temperature of one or more electric and/or electronic components of the control system itself or, in general, of the electrical apparatus itself.

Let us consider, in fact, that when the appliance is supplied, some electric/electronic components of the relevant control system are subject to heating; this occurs for example for the transformer A of FIG. 1 or 2.

Therefore, in the preferred embodiment of the invention, the sensor S of FIG. 2 will consist of a temperature sensor, such as a simple resistor with a negative temperature coefficient or NTC, duly connected to the input SS and arranged near said electric or electronic component or components.

It is clear that also in this instance it will be possible to determine, through experimental tests, the law by which the temperature of the cited electric or electronic component evolves, when the power is off, and codify it in the program memory of the microcontroller E, so as to estimate with a sufficient approximation the blackout duration and then proceed to the possible clock updating.

Moreover, in the instance of laundry washers and dishwasher, this preferred embodiment will allow to perform the "virtual clock" function according to the invention also in the steps of the machine operative cycle which does not provide for the water heating.

In fact, in the instance of laundry washers and dishwashers, a possible quantity characterizing the operation status of the appliance, being useful for estimating the duration of the blackout, could be the washing liquid temperature; however, it is clear that such a quantity may be a significant one only during the so-called "hot" steps provided by the machine operative cycle.

It is clear, on the contrary, that the above preferred embodiment of the present invention, based on the analysis of the temperature of one or more electric and/or electronic components of the electric apparatus control system, will fully remove this limitation and ensure an easy and safe programming in washing machines.

From the above, it is also clear that such a preferred embodiment allows for the application of the present invention to a large variety of electric apparatuses, others than the ones previously mentioned, provided they have an electronic control system.

A typical example is represented by cooking hobs, where the availability of a clock may prove very convenient, for programming in time the cooking functions.

Another example, for those instances where the solution according to the present invention is considered to be convenient in respect of the use of auxiliary energy sources, relates to television receiver (television sets and video-tape-recorders) which are not equipped with a teletext card, but where programmable functions could be useful (sleep timer, alarm clock function, advanced programming for the recording of a TV program, and so on).

The described solution is also particularly advantageous in the instance of alarm clocks and radio-alarm clocks, supplied by the electric mains and programmable for obtaining a warning signal at a given time, for which the present invention represents a brilliant solution to remove possible drawbacks due to a blackout.

According to the above description the features and the advantages of the present invention are clear.

In particular, a method has been described, for estimating the duration of the interruptions in the supply from the electric mains in an electric apparatus having an electronic control, in particular a household appliance, comprising the following steps:

a) measurement and storage, following an interruption of the supply voltage of the apparatus, of the value of at least a quantity being characteristic of the operation status of the apparatus itself;

b) measurement, following the restoration of the supply voltage, of the current value of said characteristic quantity;

c) comparison between the stored value and the current value of said characteristic quantity;

d) estimation, on the basis of said comparison, of the duration of the interruption of the supply voltage.

The method may also provide for the computation of the time and, following the interruption of the supply voltage, for the storage of the current time value. In this way, following the restoration of the mains supply voltage, the current time can be updated by summing the estimated duration of the interruption of the supply voltage to the time value previously stored.

This above comparison is performed on the basis of the typical trend of said characteristic quantity in time on absence of the mains supply voltage.

A household appliance has also been described, having an electronic control system, comprising at least:

an electronic control device (E) apt for the time computation;

nonvolatile readable and writable memory means (F), being associated to the electronic control device (E);

sensor means (S) being connected to the electronic control device (E), for measuring at least a quantity being characteristic of the apparatus operating status;

means (R1,R2,T) for detecting an incipient interruption of the supply voltage to the apparatus;

means (C) for the transitory supply of the electronic control device (E) and/or the memory means (F) after the detection of an interruption of the supply voltage.

Within the above memory means (F) a control program is codified for the electronic device (E), so that the latter perform:

the storage in the memory means (F) of the value of the characteristic quantity measured following the detection of the incipient interruption of the supply voltage;

the comparison between the current value of the characteristic quantity, measured following the restoration of the supply voltage, and the value of the quantity stored in the memory means (F);

the estimation, on the basis of the comparison between the current value and the stored value, of the duration of the interruption of the supply voltage.

It is obvious that many changes are possible for the man skilled in the art to the household appliance and the control method thereof described by way of example, without departing from the novelty of the inventive idea.

For instance, it is clear that the program and the information required for executing the method according to the present invention might be codified within the memory of the microcontroller E and/or in a proper area of the memory means F.

Figure 4:
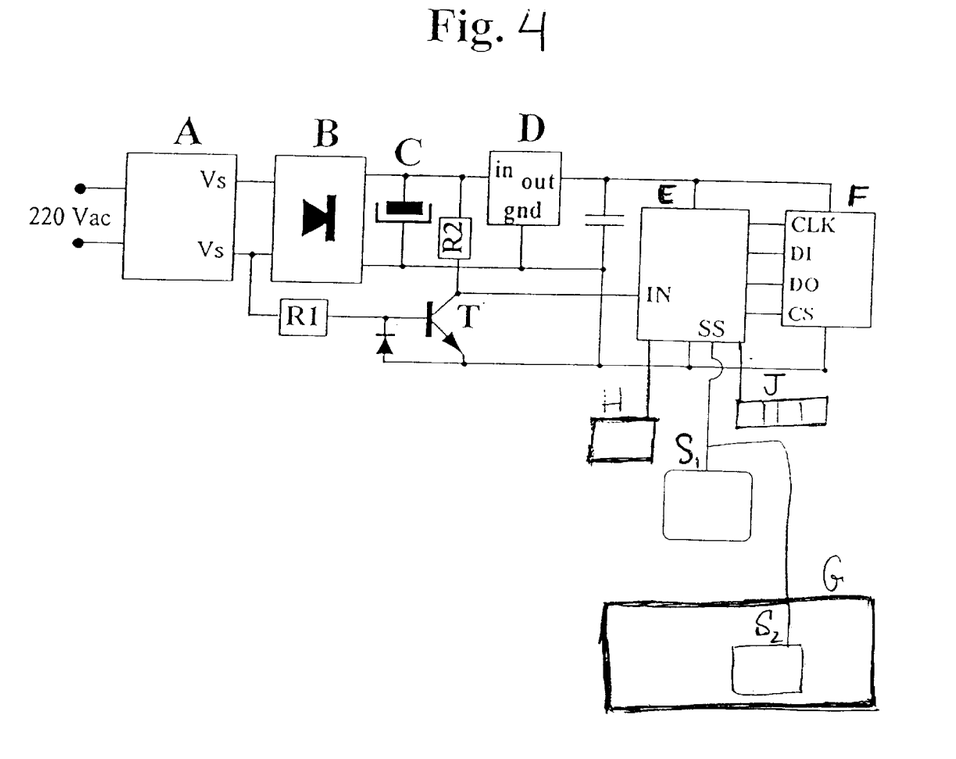
FIG. 4 shows schematically a system that senses also ambient temperatrue and provides a visual indication that a blackout has occurred.

Moreover, the possibility of programming the microcontroller E is also pointed out, in order to signal the user that a blackout occurred, for example through the flashing of a warning light H (FIG. 4), or by means of the display indicating the time being eventually associated to the microcontroller itself, also in view of a possible precise resetting of the clock through proper means J (such as keys).

In another possible variant embodiment, the solution according to the present invention for solving the problem of information loss about the current time could be paired with the recording of the total operation time of the appliance, in a special register of the memory F, in order to know its installation date; such an application can be applied for continuous operating apparatuses, or apparatuses being continuously supplied by the mains voltage, such as refrigerators and freezers, and be useful for controlling the guarantee period.

What is claimed is:

1. An electric appliance, in particular a household appliance, including:

A. an electronic control system;

B. a sensor for measuring a quantity characteristic of the operating status of the appliance;

C. a readable and writable memory accessible by the electronic control system;

D. a detector for detecting an incipient interruption of the supply voltage of the appliance;

E. supply means for providing a transitory supply of a voltage to the electronic control system and the memory after the detection of an interruption of the supply voltage, F. a control program for controlling
   i. storage within the memory of the value of the characteristic quantity measured following the detection of said incipient interruption of the supply voltage,
   ii. a comparison between a current value of the characteristic quantity, measured following the restoration of the supply voltage, and the value of the quantity stored in the memory, and
   iii. an estimation, on the basis of the comparison between the current value and the stored value, of the duration of the interruption of the supply voltage.

2. The electric appliance, according to claim 1, wherein the electronic control system includes a clock function, and the control device stores the value of the current reading of the clock in the memory following the detection of said incipient interruption of the supply voltage.

3. The electric appliance, according to claim 2, wherein the electronic control device, following the restoration of the supply voltage, updates the clock by summing the estimated duration of the interruption of the supply voltage to the time value stored in the memory.

4. The electric appliance, according to claim 1, wherein the memory contains information representative of the typical trend in time of the characteristic quantity in the absence of the supply voltage.

5. The electric appliance, according to claim 4, wherein the information is codified in a tabular method or according to the fuzzy logic rules.

6. The electric appliance, according to claim 1, wherein the sensor is a temperature sensor.

7. The electric appliance, according to claim 6, wherein the temperature sensor senses the temperature of an electric and/or electronic component of the electronic control system.

8. The electric appliance according to claim 7, wherein the temperature sensor includes a resistor with a negative temperature coefficient.

9. The electric appliance, according to claim 6, wherein the temperature sensor senses the temperature of an internal chamber of said appliance.

10. The electric appliance according to claim 6, wherein the temperature sensor senses the temperature of a liquid used in the appliance.

11. The electric appliance, according to claim 6, further including
    a. a second temperature sensor for sensing ambient temperature, and
    b. the control device uses the ambient temperature in an evaluation of the trend in time of the characteristic quantity in the absence of supply voltage.

12. Electric appliance, according to claim 1, characterized in that the supply means is a capacitor.

13. The electric appliance, according to claim 1, wherein the detector includes a transistor that is connected to receive at its base through a resistor the alternating voltage at an output of a transformer that is connected to provide the supply voltage.

14. The electric appliance, according to claim 13, wherein the detector further includes a pull-up resistance for presenting to an input of the electronic control system a square wave generated at the output of the collector of said transistor.

15. The electric appliance, according to claim 1, wherein the electronic control system is a microcontroller or similar dedicated electronic device.

16. The electric appliance, according to claim 1, wherein the memory is electrically writable and erasable, and of the EEPROM or FLASH type.

17. The electric appliance, according to claim 1, further including signaling means for signaling that an interruption of the supply voltage has occurred.

18. The electric appliance, according to claim 17, wherein the signaling means is a light that flashes to indicate an interruption has occurred.

19. The electric appliance, according to claim 2, further including means for manually resetting the clock function, in particular through activation of keys.

20. The electric appliance, according to claim 1, wherein the control device directs the storage of information relating to the duration, number, and frequency of the interruptions of the supply voltage in the memory.

21. The electric appliance, according to claim 1, wherein the control device is prearranged for storing within the memory the total operation time of the appliance.

22. The electric appliance, according to claim 1, wherein the household appliance is of the continuously operating type, such as a refrigerating appliance, a water heater, a boiler.

23. The electric appliance, according to claim 1, wherein the household appliance is of the type that is programmed for the execution of determined operative cycles or functions at given times, such as a cooking appliance, a washing machine, a television receiver, an alarm clock or radio-alarm clock.

24. Method for estimating the duration of the interruptions in the supply from the electric mains in an electric appliance having an electronic control system, in particular a household appliance, the method including the steps of:
  A. measurement and storage, on the occasion of an interruption of the supply voltage of the appliance, of the value of a quantity being characteristic of the operating status of the appliance;
  B. measurement, on the occasion of the restoration of the supply voltage, of the current value of the characteristic quantity;
  C. comparing the stored value and the measured current value of said characteristic quantity; and
  D. estimating, on the basis of said comparison, of the duration of said interruption of the supply voltage.

25. The method, according to claim 24, further including the step of storing the value of the current time on the occasion of an interruption of the supply voltage.

26. The method, according to claim 25, further including the steps of, on the occasion of the restoration of the supply voltage, updating the current time by summing the estimated duration of said interruption of the supply voltage to the time value stored on the occasion of the interruption of the supply voltage.

27. The method, according to claim 26, further including the step of updating the programming of the execution of predetermined operating cycles or functions of the appliance based on the updated current time.

28. The method, according to claim 24, wherein the step of comparing is performed on the basis of the typical temporal trend of the characteristic quantity in the absence of the supply voltage.

29. The method, according to claim 24, wherein the characteristic quantity is a temperature.

30. The method, according to claim 29, wherein the measured temperature is the temperature of a component of the electronic control system.

31. The method, according to claim 29, wherein the measured temperature is the temperature of an internal chamber of the appliance.

32. The method, according to claim 29, wherein the measured temperature is the temperature of a liquid used in the appliance.

33. The method, according to claim 24, further including the step of measuring ambient temperature and including the ambient temperature in an evaluation of the temporal trend of the characteristic quantity in the absence of the supply voltage.

34. The method, according to claim 24, wherein information relating to the interruptions of the supply voltage, such as their duration and/or their number and/or their frequency, is stored for use in servicing, maintaining, repairing and diagnosing faults of the appliance.

35. The method, according to claim 34, wherein the estimated duration of the interruption is used to determine the total time of operation of the appliance for dating its installation date and controlling its guarantee period.

* * * * *